US008000840B2

(12) United States Patent  (10) Patent No.: US 8,000,840 B2
Nielsen  (45) Date of Patent: Aug. 16, 2011

(54) METHOD OF START UP AT LEAST A PART OF A WIND POWER PLANT, WIND POWER PLANT AND USE OF THE WIND POWER PLANT

(75) Inventor: Kaj Skov Nielsen, Issaquah, WA (US)

(73) Assignee: Siemens Aktiengesellschaft, Munich (DE)

( * ) Notice: Subject to any disclaimer, the term of this patent is extended or adjusted under 35 U.S.C. 154(b) by 155 days.

(21) Appl. No.: 12/152,213

(22) Filed: May 13, 2008

(65) Prior Publication Data

US 2008/0284172 A1  Nov. 20, 2008

(30) Foreign Application Priority Data

May 14, 2007  (EP) .................................. 07009644

(51) Int. Cl.
G05D 3/12 (2006.01)
F03D 9/00 (2006.01)
F03B 13/10 (2006.01)
G05F 1/70 (2006.01)

(52) U.S. Cl. ............ 700/286; 700/287; 290/43; 290/44; 290/55; 323/210; 60/340

(58) Field of Classification Search .................. 700/286, 700/287; 290/44, 43, 55; 323/210; 264/40.7; 60/340

See application file for complete search history.

(56) References Cited

U.S. PATENT DOCUMENTS

| | | | | |
|---|---|---|---|---|
| 4,193,005 A * | 3/1980 | Kos et al. | .......................... | 290/44 |
| 4,357,542 A * | 11/1982 | Kirschbaum | ................... | 290/44 |
| 4,420,692 A * | 12/1983 | Kos et al. | ......................... | 290/44 |
| 6,194,793 B1 * | 2/2001 | Fisher, Jr. | ........................ | 307/66 |
| 6,670,721 B2 * | 12/2003 | Lof et al. | ......................... | 290/44 |
| 6,671,585 B2 * | 12/2003 | Lof et al. | ......................... | 705/36 R |
| 6,682,669 B2 * | 1/2004 | Bulgrin et al. | ................ | 264/40.1 |
| 6,980,934 B1 * | 12/2005 | Sadovnik | ........................ | 703/1 |
| 7,391,126 B2 * | 6/2008 | Liu et al. | ......................... | 290/44 |
| 7,523,001 B2 * | 4/2009 | Morjaria et al. | ................. | 702/3 |
| 7,550,870 B2 * | 6/2009 | Reynolds et al. | ............... | 307/32 |
| 2002/0198648 A1 * | 12/2002 | Gilbreth et al. | ............... | 701/100 |
| 2004/0044442 A1 * | 3/2004 | Bayoumi et al. | .............. | 700/286 |
| 2007/0108769 A1 | 5/2007 | Wobben | | |
| 2007/0108771 A1 * | 5/2007 | Jones et al. | ...................... | 290/44 |
| 2008/0195255 A1 * | 8/2008 | Lutze et al. | .................... | 700/291 |
| 2009/0234510 A1 * | 9/2009 | Helle et al. | ..................... | 700/287 |

FOREIGN PATENT DOCUMENTS

EP 1752659 A2 2/2007
WO WO 2004099604 A2 11/2004

OTHER PUBLICATIONS

Enslin-J., "Interconnection of Distributed Power to the Distribution Network", 2004, IEEE Young Researchers Symposium. 1-42 pages.*
Hansen et al. "Wind Farm Modelling for Power Quality", 2001, IEEE, p. 1959-1964.*
Dickers et al., "Modelling for Grid Restoration Studies", 1987, Dept. of Electrical Power Systems, Duisburg, pp. 45-55.*
Market Development National Grid Company PLC, "An Introduction to Black Start"; Feb. 2001, pp. 1-10.

* cited by examiner

*Primary Examiner* — Albert DeCady
*Assistant Examiner* — Thomas Stevens

(57) ABSTRACT

A wind power plant and a method of start up at least a part of a wind power plant connected to an external grid substantially without any energy delivered from the external grid for the start up is provided. The wind power plant having a plurality of wind turbines and at least one power source connected to at least one of the wind turbines in order to start the wind turbine while isolated from the remaining wind turbines. The started wind turbine may then supply power in order to start further wind turbines. Power may be delivered to the grid from the started wind turbines.

20 Claims, 2 Drawing Sheets

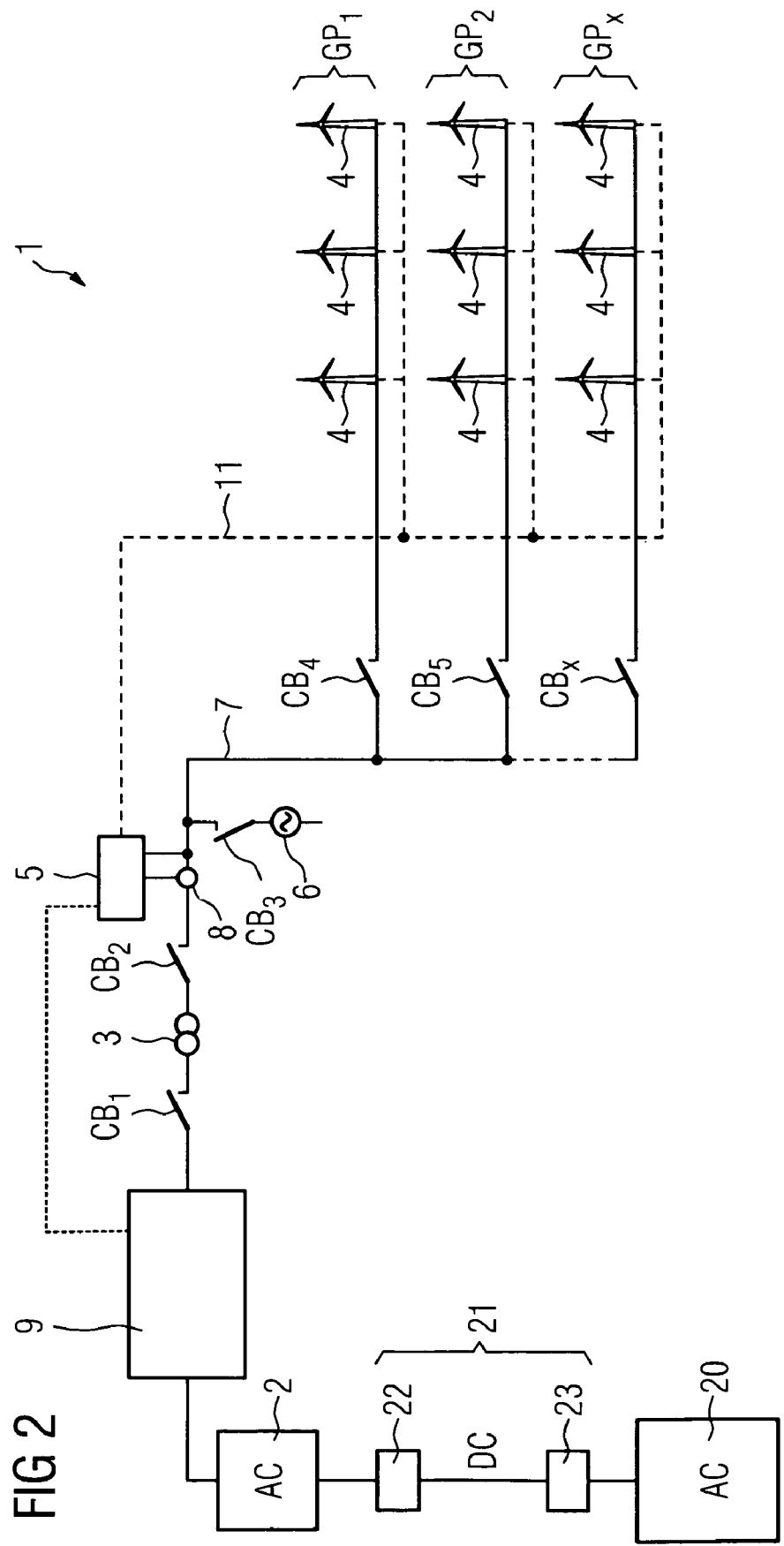

METHOD OF START UP AT LEAST A PART OF A WIND POWER PLANT, WIND POWER PLANT AND USE OF THE WIND POWER PLANT

CROSS REFERENCE TO RELATED APPLICATIONS

This application claims priority of European Patent Office application No. 07009644.1 EP filed Apr. 14, 2007, which is incorporated by reference herein in its entirety.

FIELD OF INVENTION

The invention relates to a method of start up at least a part of a wind power plant combinable to an external grid in particular after a complete collapse of the external grid. The invention relates also to a wind power plant and to the use of the wind power plant for the restoration of the voltage and/or the power on at least a part of the external grid.

BACKGROUND OF INVENTION

A wind power plant is as a rule at least a part of an electrical power supply e.g. of a region or a country and is therefore connected to a grid as the transmission and/or distribution system of the voltage and/or the power of the electrical power supply. In general, all power plants need electrical power to start up. Under stable operation conditions a power plant delivers then a voltage and/or power to the grid. Under normal circumstances the electrical power for a start up of a power plant is provided from the transmission and/or the distribution system, thus from the grid of the electrical power supply.

But there can situations arise e.g. a normal outage or a disaster in which a collapse of at least a part of the grid occurs so that all or some power plants shut down. In this case no electrical power is available from the grid to restart a power plant. Therefore a power system or an electrical power supply comprising power plants and a transmission and/or distribution grid requires some contingency arrangements to enable a restart in the event that all or a part of the electrical power supply was shut down. The process of restoring the electrical power supply is commonly referred to as a black or a cold start.

In "An Introduction to Black Start", February 2001, Market Development, National Grid Company plc, is described that isolated so called black start power stations being started individually and gradually being reconnected to each other in order to form an interconnected electrical power supply or power system again. Under emergency conditions a black start station thereby receives the necessary electrical power for the restart and the start up respectively from a small auxiliary generating plant located on-site. Such an auxiliary generating plant can be a small gas turbine or a diesel plant, the minimum size of which is dependent on the size of the black start power station.

SUMMARY OF INVENTION

Thus when e.g. a total power breakdown of a grid to which a wind power plant is connected occurred and the wind power plant was shut down the wind power plant can first then be restarted and started up respectively when enough electrical power is available on the grid for the start up of the wind power plant. This causes a loss of production of electrical power by the wind power plant.

It is therefore an object of the present invention to provide a method for a wind power plant and a wind power plant in such a way that the start up of at least a part of the wind power plant is preferably accelerated. A further object of the invention is to provide a new use of a wind power plant.

The first object is inventively achieved by a method of start up at least a part of a wind power plant and by a wind power plant which is combinable to an external grid respectively substantially without any energy delivered from the external grid for the start up, the wind power plant comprises several wind turbines and at least one local electrical power source reversible combinable to at least one wind turbine of the wind power plant, wherein the wind power plant is disconnected from the external grid, one start up wind turbine or a group of start up wind turbines of the wind turbines of the wind power plant is isolated from the remaining wind turbines of the wind power plant, the one start up wind turbine or the group of start up wind turbines is connected to the local electrical power source and the one start up wind turbine or the group of start up wind turbines is started up using the electrical power delivered from the local electrical power source, and wherein the power deliverable from the wind power plant is used for a black or a cold start of at least a part of the external grid to establish the voltage and/or the power on the external grid.

With this method it is possible to start up or to restart at least a part of the wind power plant, thus at least some wind turbines of the wind power plant which in operation is normally connected to an external grid e.g. after a complete collapse of the entire external grid substantially without any electrical power or energy delivered from the external grid for the start up. The external grid is normally a power transmission and/or distribution grid of an electrical power supply. The external grid can be a local grid or a regional grid or a grid in a larger area. According to the invention the electrical power for the start up is preferably exclusively provided from a small local electrical power source which is substantially independently operated from the external grid and can be connected to at least one start up wind turbine or a group of start up wind turbines of the wind power plant. Thus the start up in particular the restart of at least a part of the wind power plant is independently from an external grid and thus simplified and accelerated. This results in a higher availability of the wind power plant and in better yield for a wind power plant operator because the production of electrical power is resumed faster e.g. after a power drop. It is clear that the method of start up at least a part of the wind power plant is preferably executed when the wind conditions are sufficient for a stable operation of the wind turbines of the wind power plant. As a rule thereby all operable wind turbines of the wind power plant are started up. Due to the start up the electrical power deliverable from the wind power plant is used for a black or cold start of at least a part of the external grid to establish the voltage and/or the power on the external grid.

According to an embodiment of the invention a next wind turbine or a next group of wind turbines of the wind power plant is started up using the electrical power delivered from the one start up wind turbine or the group of start up wind turbines in particular when a stable operation of the one start up wind turbine or the group of start up wind turbines is achieved. A stable operation of a start up or any other wind turbine means that the power output, the output voltage and/or the frequency of the output voltage of the wind turbine are substantially stable, thus in predetermined ranges under given wind conditions.

According to another embodiment of the invention single wind turbines or groups of wind turbines of the wind power plant are successively started up using the electrical power delivered from one or more start up and/or other wind turbines of the wind power plant which are preferably in stable operation.

Thus the wind power plant is started up stepwise or gradually. The more electrical power is available within the wind power plant the faster the remaining wind turbines can be started up until preferably all wind turbines of the wind power plant are started up.

According to a variant of the invention the wind power plant comprises at least one central power plant controller which is linked with the wind turbines and controls the start up of the wind power plant. The central power plant controller thereby controls preferably the production and consumption of electrical power in the wind power plant by monitoring the output voltages and the frequencies of the output voltages of the wind turbines. The central power plant controller is preferably reversible combinable to the local power source.

According to an embodiment of the invention the wind power plant comprises several circuit breakers preferably operated from the central power plant controller to close and open electrical connections. Thus the central power plant controller can control which start up wind turbine or which group of start up wind turbines is connected to the local power source for the start up. Furthermore the central power plant controller can control which wind turbine or which group of wind turbines is connected for the further start up to one or several already started up start up wind turbines or other already started up wind turbines.

According to a further embodiment of the invention the wind power plant is reconnected to the external grid when a predetermined number of wind turbines of the wind power plant is in stable operation what means as mentioned above that the wind turbines maintain the power output, the output voltage and/or the frequency of the output voltage substantially stable within predetermined ranges under given wind conditions. By that proceeding it is possible to deliver already electrical power to the external grid even before all wind turbines of the wind power plant are in operation or in stable operation what is positive for the yield of the wind power plant operator. The predetermined number of wind turbines depends thereby from the type of the wind turbines of the wind power plant in particular from the output voltage and/or the power output of the respective type of wind turbine.

According to an alternative the wind power plant is first preferably completely run up in a stable open-circuit operation and then reconnected to the external grid.

The wind power plant is particularly combinable to the external grid via a transformer and/or via a frequency synchronising device. Thus the output voltage of the wind power plant can be transformed and/or the wind power plant can be connected to the external grid when the frequencies of the output voltage of the wind power plant and the voltage on the external grid are at least substantially equal to each other.

According to a variant of the invention the voltage and/or the power of the external grid can be only established by the voltage and/or the power delivered from the wind power plant or by the voltage and/or the power delivered from the wind power plant in combination with a voltage and/or a power delivered from at least one other voltage or power source. The other voltage or power source can thereby be at least another wind power plant, a cogeneration plant or a photovoltaic plant.

According to another variant of the invention the central power plant controller is linked with the wind turbines via a communication network. The communication network can thereby be a wireless or a wired communication network.

According to an embodiment of the invention the local power source is or comprise a battery preferably a large battery, an uninterruptible power source (UPS) or a generator. The local power source can be or can comprise e.g. a diesel generator or fuel cell. The size of the local power source is thereby adapted to the voltage and/or the power necessary for start up at least one wind turbine or at least one group of wind turbines. E.g. a large 3.6 MW wind turbine requires about 690 V and about 30 kW for the control, the motors and the inverters, which is a little less than 1% of the power of the wind turbine. The duration of the local power source can be from a few minutes up to one hour.

The further object of the invention is achieved by the use of a method or a wind power plant as disclosed before for a black or cold start of at least a part of an external grid to establish the voltage and/or the power on the external grid.

BRIEF DESCRIPTION OF THE DRAWINGS

The invention will in the following be explained in more detail with reference to the schematic drawings, where FIG. 1 shows schematically a wind power plant according to the invention and FIG. 2 shows the wind power plant of FIG. 1 connected to an external grid via a frequency synchronising device.

DETAILED DESCRIPTION OF INVENTION

Figure 1:
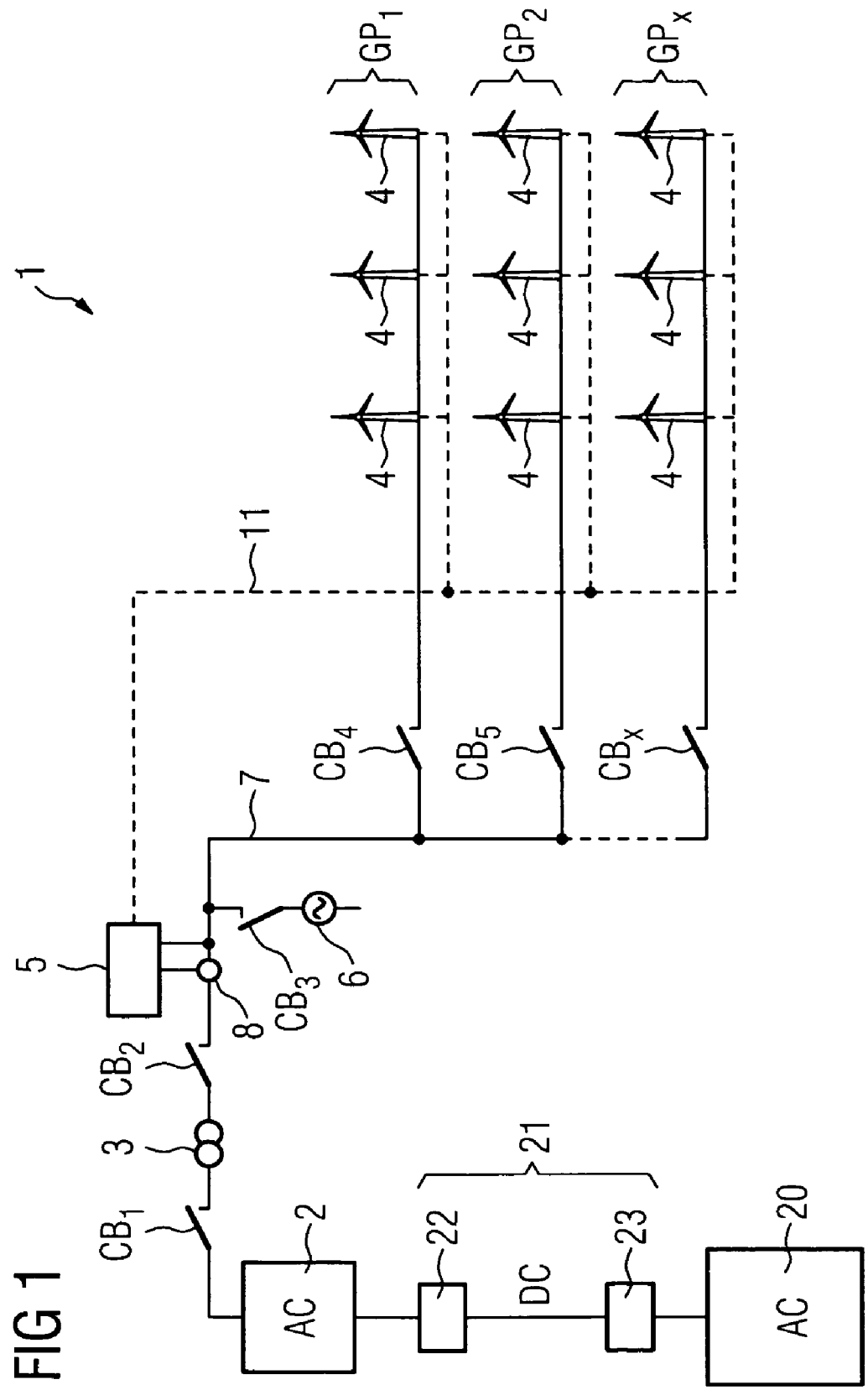

FIG. 1 shows schematically a wind power plant 1 according to the invention. The wind power plant 1 is combinable to an external grid 2 via a transformer 3. In case of the present embodiment the grid 2 is a local or small AC island grid connected by a HDVC link 21 (high voltage direct current) to a main AC grid 20. The HDVC link 21 comprises in a common manner on the side of the grid 2 a rectifier 22 and on the side of the main grid 20 an inverter 23. During a normal operation and under given sufficient wind conditions the wind power plant 1 delivers electrical power and/or an output voltage to the grid 2. In the case when the wind power plant 1 was shut down e.g. because of high wind conditions the wind power plant can be started up or restarted with electrical power delivered from the grid 2.

But there can situations arise like normal outages or disasters in which a complete collapse of an entire grid occurs and nearly all power plants connected to the grid shut down. Then a black or cold start of the entire power system or the entire electrical power supply comprising power plants and a transmission and/or distribution system and the entire grid respectively is necessary. In such a situation a wind power plant can first then be started up or restarted when enough electrical power is available on the grid for the start up which can lead to a delay of the start up of the wind power plant even when the wind conditions are adequate for the operation of the wind power plant.

In particular to overcome this delay and/or to contribute to a black start of at least a part of a grid the wind power plant 1 is according to the invention prepared to start up or to restart substantially without any energy delivered from the grid particularly from the grid 2.

In case of the present embodiment the wind power plant 1 therefore comprises several wind turbines 4, a central power plant controller 5, several circuit breakers $CB_1$-$CB_X$ and a small local power source 6.

In case of the present embodiment respectively three wind turbines 4 are combined to one group $GP_1$-$GP_X$ of wind turbines 4. But it is also possible that a group comprises one, two or more wind turbines 4. Each group $GP_1$-$GP_X$ of wind turbines 4 is combinable to a power supply line 7 of the wind power plant 1 by one of the circuit breakers $CB_4$-$CB_X$. The local power source 6 is combinable to the power supply line 7 by the circuit breaker $CB_3$ and the transformer 3 is combinable to the power supply line 7 by the circuit breaker $CB_2$. The central power plant controller 5 is also connected to the power supply line 7 and operates the circuit breakers $CB_1$-$CB_X$ to open and close the electrical connection. The groups $GP_1$-$GP_X$ of wind turbines 4 and the central power plant controller 5 are reversible combinable to the local power source 6 by the circuit breakers $CB_3$-$CB_X$.

The wind turbines 4 are additionally connected to the central power plant controller 5 via a fast communication network 11. In case of the present embodiment the fast communication network is a wired network e.g. an Ethernet. But the communication network can also comprise fibre optic cables. The communication network could also be a wireless network e.g. based on electromagnetic waves or any other communication network providing the necessary band-width for a fast data transmission like a set point from the central power plant controller 5 to a wind turbine 4. Thus the central power plant controller 5 can communicate with all the wind turbines 4 of the wind power plant 1 in particular with each not explicitly shown turbine controller of each wind turbine 4.

The central power plant controller 5 controls and balances the production and consumption of electrical power in the wind power plant 1 by monitoring the output voltage and the frequency of the output voltage during the normal operation, a start up and a black start sequence. The output voltages at the turbine controllers of the wind turbines 4 are regulated based on a measurement of the output voltage of the wind power plant 1 at the central point 8. The production levels at the individual wind turbines 4 are regulated based on a measured frequency by a frequency controller. The frequency controller may be placed locally at the turbine controller of a wind turbine 4 communicating with the central power plant controller 5 or centrally at the central power plant controller 5 or a combination of both. The regulation of the output voltage and the frequency may be based on a PID-controller (proportional plus integral plus derivative), a fuzzy controller, a neural network or on a combination thereof.

For the explanation of the invention it is assumed that there was a failure of the HVDC link 21 from the grid 2 to the main grid 20. Thus the grid 2 collapsed and the wind power plant 1 shut down. Now the wind power plant 1 can be used to restore or to establish the electrical power and/or the voltage on the external grid 2 granted that the wind speed is in the normal or in an adequate operating range for the operation of the wind power plant 1.

In the first step the circuit breaker $CB_3$ is closed which can be done e.g. by hand to connect the central power plant controller 5 to the small local power source 6 which can be a battery or general a UPS (uninterruptible power source) or a generator. Thus the central power plant controller 5 is supplied with electrical power from the local power source 6 and can control the start up and the black start sequence in particular the central power plant controller 5 can open and close the circuit breakers. Then all not yet opened circuit breakers $CB_1$-$CB_X$ except circuit breaker $CB_3$ are opened. Thus the wind power plant 1 is disconnected from the external local transmission and distribution grid 2. This ensures that no electrical power is fed back to the transmission and distribution lines of the external grid 2 before the wind power plant 1 is in a stable operation.

In case of the present embodiment the wind turbines 4 of the group $GP_1$ are the start up wind turbines 4. In consequence of the open circuit breakers $CB_4$-$CB_X$ the groups $GP_1$-$GP_X$ of wind turbines 4 are isolated from each other.

For start up the start up wind turbines 4 of group $GP_1$ the circuit breaker $CB_4$ operated by the central power plant controller 5 is closed and the wind turbines 4 of group $GP_1$ are connected to the power supply line 7 and to the local power source 6. Subsequently the start up wind turbines 4 of group $GP_1$ of the wind power plant 1 are started up under control of the central power plant controller 5 using the electrical power delivered from the local power source 6. Thereby each generator and each inverter of each wind turbine 4 of group $GP_1$ are adjusted and operated in such a way that the start up function is supported. In this manner it is possible with each wind turbine controller of each wind turbine 4 to control e.g. the magnetising currents of the respective generator of the wind turbine 4 so that the start up of a wind turbine 4 of the wind power plant 1 and thus of the whole wind power plant 1 can be performed without any energy or power supply of a external grid like the grid 2.

When a stable operation of the group $GP_1$ of start up wind turbines 4 is achieved what means that the output voltages and the frequency of the output voltages of the wind turbines 4 of group $GP_1$ are in predetermined ranges under given wind conditions the next group $GP_2$ of wind turbines 4 of the wind power plant 1 is started up using preferably the electrical power delivered from the start up wind turbines 4 of group $GP_1$ which are in a stable operation. In this situation the circuit breaker $CB_5$ is closed and the circuit breaker $CB_3$ is opened. But it is also possible to leave the circuit breaker $CB_3$ closed and use also the power delivered from the local power source 6 to start up the wind turbines 4 of group $GP_2$. By the way when the circuit breaker $CB_3$ is opened the power for operating the central power plant controller 5 is delivered from the start up wind turbines 4.

In this manner all groups $GP_2$-$GP_X$ of wind turbines 4 of the wind power plant 1 and thus the whole wind power plant 1 are successively started up using the electrical power delivered from one or more start up and/or other wind turbines 4 of the wind power plant 1 when the electrical power delivering wind turbines in a stable operation.

According to a development of the invention the wind power plant 1 is gradually reconnected to the external grid 2 when a predetermined number of wind turbines 4 of the wind power plant 1 is in a stable operation. The predetermined number of wind turbines 4 in stable operation depends thereby on the nominal output voltages of the type of wind turbines 4 and/or on the capacity of the external grid 2. For the reconnection of the wind power plant 1 to the external grid 2 the circuit breaker $CB_2$ and the circuit breaker $CB_1$ are closed by the central power plant controller 5.

The electrical power and/or voltage delivered from the wind power plant 1 to the external grid 2 is in case of the present embodiment used for the black or cold start of the external grid 2 in particular to restore or to establish the voltage and/or the power on the external grid 2 before the external grid 2 is connected back to the main grid 20 by the HVDC link 21. As the load increases the wind turbines 4 use their frequency controller to manage the output voltage up to the level that can be sustained by the available wind.

From the present embodiment of the invention it becomes clear that a wind power plant 1 can be started up or restarted substantially without any energy delivered from an external grid 2 which can be part of a main grid. The electrical power delivered from the wind power plant 1 during and/or after the start up of the wind power plant 1 can be used for a black or a cold start at least of the external grid 2 in particular to restore or establish the voltage and/or the power on the grid 2. Thus the delay up to a power delivery of the wind power plant 1 to the grid 2 e.g. after a grid outage can be reduced. The described proceeding could be used under normal outages or in disaster situations where conventional courses may take longer to restore full power production. So if the wind conditions are adequate a wind power plant as a black start station like the wind power plant 1 is able to restore the voltage and/or the power faster than a thermal plant as a black start station on an external grid, where temperature increases is a critical factor and a rapid temperature increase potentially can cause damage to the equipment.

The wind power plant 1 in particular the black or cold start function of the wind power plant 1 can be used to establish a external grid like the local grid 2 independently or in combination with at least another voltage or power source in form of another wind power plant, a small cogeneration plant, a photo voltaic plant or any other proper plant. The wind power plant 1 can further be used to re-establish a grid in a larger area.

In case of the present embodiment it is alternatively possible that the wind power plant 1 is run up in an open-circuit operation and when stable in operation reconnected to the grid 2 by the circuit breakers $CB_1$ and $CB_2$ to produce power in particular when the HVDC link 21 is connected.

As shown in FIG. 2 it is also possible to use additionally a frequency synchronising device 9 connected to the wind power plant controller 5. It is then possible to connect the wind power plant 1 to the grid 2 when the frequency of the output voltage of the wind power plant 1 and the frequency of the voltage of the grid 2 are substantially equal to each other.

It is remarked that the described example of the invention is only an embodiment of the invention. Thus other embodiments of the invention are possible without leaving the scope of the invention.

Normally the central power plant controller 5 is adjusted for executing one of the inventive methods namely to start up the wind power plant 1 and/or to control the black start sequence of the wind power plant 1. For this purpose the central power plant controller 5 e.g. in form of a computer or computing unit comprises a respective computer program. But the central power plant controller 5 is not absolutely necessary in particular when a wind turbine controller of a wind turbine 4 takes on the function of the central power plant controller 5 particularly during the start up and/or the black start sequence. Thus one of the wind turbine controllers can be adjusted to start up the wind power plant 1 and/or to control the black start sequence of the wind power plant 1.

In case of a battery as local power source 6 of the wind power plant 1, this battery can be loaded by the wind turbines 4 of the wind power plant 1. Preferably there exists a monitored load cycle of the battery that the battery is preferably always in the condition for a start up and/or black start sequence. The load can be easily done by closing the circuit breaker $CB_3$ operated e.g. by the central power pant controller 5.

The invention has additionally to the advantages already mentioned the advantage of a potentially better service for local utility customers connected to the grid when the grid is restored faster after a power loss.

Furthermore by the invention there is faster more power available to a grid operator providing more flexibility for restoring the grid.

Especially with more wind power plants distributed over a lager geographical area the ability of any of these wind power plants to contribute to restoring power on a grid increases even though any individual wind power plant may not have the wind resources needed to supply this service. When wind power reaches high level of penetration, it will become more urgent for the grid stability to be able to restore supply from this resource faster.

The invention claimed is:

1. A method to start up at least a portion of a wind power plant connected to an external grid, the start up is substantially without any energy delivered from the external grid, the wind power plant comprises a plurality of wind turbines, comprising:
    isolating at least one of the wind turbines from the plurality of wind turbines for start up when the wind power plant is disconnected from the external grid;
    connecting the at least one isolated wind turbine to a power source local to the wind power plant, configured to start the at least one isolated wind turbine;
    starting the at least one isolated wind turbine via power delivered from the connected local power source;
    starting at least one next wind turbine from the plurality of wind turbines via the power delivered from the at least one isolated wind turbine started via the local power source when a stable operation of the started at least one isolated wind turbine is achieved,
    wherein the power deliverable from the wind power plant is used for a black or a cold start of at least a part of the external grid to establish a voltage and/or the power on the external grid.

2. The method according to claim 1, wherein single wind turbines or groups of wind turbines of the wind power plant are successively started up via the power delivered from the started at least one isolated wind turbine.

3. The method according to claim 2, wherein the wind power plant is reconnected to the external grid when a predetermined number of wind turbines of the wind power plant are in stable operation.

4. The method according to claim 2, wherein the wind power plant is reconnected to the external grid when a predetermined number of wind turbines of the wind power plant are in stable operation.

5. The method according to claim 1, wherein the wind power plant comprises at least one central power plant controller which is linked with the wind turbines and controls the start up of the wind power plant.

6. The method according to claim 5, wherein the central power plant controller is reversible connected to the local power source.

7. The method according to claim 5, wherein the wind power plant comprises a plurality of circuit breakers operated from the central power plant controller to close and open electrical connections.

8. The method according to any one of the claim 5, wherein the central power plant controller is linked with the wind turbines via a communication network.

9. The method according to claim 1, wherein the wind power plant is run up in an open-circuit operation and then reconnected to the external grid.

10. The method according to claim 1, wherein the wind power plant is connected to the external grid via a transformer or via a frequency synchronising device.

11. The method according to claim 1, wherein the voltage and/or the power of the external grid is only established by the voltage and/or the power delivered from the wind power plant or by the voltage and/or the power delivered from the wind power plant in combination with at least one other voltage or power source.

12. The method according to claim 11, wherein the other voltage or power source is another wind power plant, a cogeneration plant or a photovoltaic plant.

13. The method according to any one of the claim 1, wherein the local power source comprises a battery, an uninterruptible power source or a generator.

14. A wind power plant connected to an external grid, comprising:
- a plurality of wind turbines, at least one of the wind turbines is isolated from a remaining wind turbines of the plurality of wind turbines; and
- a local power source connected to the at least one isolated wind turbine,
- wherein when the wind power plant is separated from the external grid, the at least one isolated wind turbine is started via power delivered via the local power source,
- wherein start up at least a part of the wind power plant is with a minimum amount of energy delivered from the external grid,
- wherein the power deliverable from the wind power plant is used for a black or cold start of at least a part of the external grid to at least establish a voltage on the external grid and
- wherein at least one next wind turbine from the plurality of wind turbines is started via the power delivered from the started at least one isolated wind turbine when a stable operation of the started at least one isolated wind turbine is achieved.

15. The wind power plant according to claim 14, wherein single wind turbines or groups of wind turbines of the wind power plant are successively started up via the power delivered from the started at least one isolated wind turbine.

16. The wind power plant according to claim 15, wherein the wind power plant is reconnected to the external grid when a predetermined number of wind turbines of the wind power plant are in stable operation.

17. The wind power plant according to claim 14, wherein the wind power plant comprises at least one central power plant controller which is linked with the wind turbines and controls the start up of the wind power plant.

18. The wind power plant according to claim 17, wherein the central power plant controller is reversible combinable to the local power source so that central power plant controller can control delivery of power from the local power source to the local power source or from the local power source.

19. The wind power plant according to claim 17, wherein the wind power plant further comprises a plurality of circuit breakers operated from the central power plant controller to close and open electrical connections.

20. The wind power plant according to claim 14, wherein wind power plant is able to be started in an open-circuit operation and then reconnected to the external grid.

* * * * *